US012170181B2

(12) United States Patent
Gaudinat et al.

(10) Patent No.: US 12,170,181 B2
(45) Date of Patent: Dec. 17, 2024

(54) PYROTECHNIC CIRCUIT BREAKER

(71) Applicant: AUTOLIV DEVELOPMENT AB, Vargarda (SE)

(72) Inventors: Francois Gaudinat, Amblainville (FR); Gildas Clech, Plougastel-Daoulas (FR); Jean Champendal, Quimper (FR); Isaure Masquelier, Paris (FR); Ludovic Lageat, Plougastel-Daoulas (FR)

(73) Assignee: Autoliv Development AB, Vargarda (SE)

(*) Notice: Subject to any disclaimer, the term of this patent is extended or adjusted under 35 U.S.C. 154(b) by 110 days.

(21) Appl. No.: 18/003,636

(22) PCT Filed: Jul. 1, 2021

(86) PCT No.: PCT/EP2021/068114

§ 371 (c)(1),
(2) Date: Dec. 28, 2022

(87) PCT Pub. No.: WO2022/003080

PCT Pub. Date: Jan. 6, 2022

(65) Prior Publication Data

US 2023/0260726 A1 Aug. 17, 2023

(30) Foreign Application Priority Data

Jul. 2, 2020 (FR) ........................................ 2007024

(51) Int. Cl.
*H01H 39/00* (2006.01)

(52) U.S. Cl.
CPC .................................. *H01H 39/006* (2013.01)

(58) Field of Classification Search
CPC . H01H 39/00; H01H 39/006; H01H 2039/008
See application file for complete search history.

(56) References Cited

U.S. PATENT DOCUMENTS 4,852,494 A 8/1989 Williams
7,123,124 B2 * 10/2006 Caruso ................. H01H 39/006 200/61.08

(Continued)

FOREIGN PATENT DOCUMENTS

DE 102012013491 B3 9/2013
FR 3017240 A1 8/2015

*Primary Examiner* — Jacob R Crum
(74) *Attorney, Agent, or Firm* — Harness, Dickey & Pierce, P.L.C.; Stephen T. Olson

(57) ABSTRACT

A pyrotechnic circuit breaker comprising: a casing, at least two connection terminals, an internal electrical circuit connecting the two connection terminals and formed for example by an electrical conductor, an opening member, which is movable and arranged to open a part to be opened of the internal electrical circuit when moving between an initial position and a final position, so as to form at least two discrete portions of conductor after opening, a pyrotechnic actuator arranged to move the opening member from the initial position to the final position, an inner chamber defined by an internal wall formed in the casing, and receiving the part to be opened, an insulating grease, arranged in the inner chamber, wherein the insulating grease is arranged on or covers at least two predetermined parts of the internal wall.

17 Claims, 4 Drawing Sheets

(56) References Cited

U.S. PATENT DOCUMENTS

| | | | | |
|---|---|---|---|---|
| 2013/0175144 | A1* | 7/2013 | Sprenger | H01H 39/006 200/61.08 |
| 2014/0326122 | A1* | 11/2014 | Ukon | B23D 15/145 83/468.1 |
| 2016/0336131 | A1* | 11/2016 | Fellmer | H01H 33/182 |
| 2016/0351363 | A1* | 12/2016 | Gaudinat | B60L 3/04 |
| 2020/0066465 | A1* | 2/2020 | Moszynski | H01H 9/32 |

* cited by examiner

PYROTECHNIC CIRCUIT BREAKER

TECHNICAL FIELD OF THE INVENTION

The present invention relates in general to a pyrotechnic circuit breaker intended to be mounted on a motor vehicle, and in particular in an electrical power circuit of a motor vehicle, for example a hybrid vehicle or an electric vehicle.

STATE OF THE ART

Circuit breaker devices, such as the one described in document US20130175144, which proposes to use a flowable insulating material. On the other hand, this system notably has the drawback of requiring a lot of flowable insulating material, which requires large quantities, can generate leaks. In the case of a material containing silicone, precautions and authorizations will be necessary for automotive use (due to not being compatible with the paint for example). Furthermore, the applicant has noticed that such a flowable insulating material can generate longer opening times and/or degraded performance during the operation of the circuit breaker (the time taken to effectively cut off the passage of a high-power current (for example at least 100 A/100 V, or for example 800 A/450 V)). Finally, it is important to be able to guarantee good insulation resistance after operation.

DISCLOSURE OF THE INVENTION

One aim of the present invention is to address the disadvantages of the prior art mentioned above and in particular, first of all, to propose a pyrotechnic circuit breaker that is simple to manufacture, having high cutting capacities, a rapid opening time during operation, and good insulation resistance after opening.

A first aspect of the invention therefore relates to a pyrotechnic circuit breaker comprising:

- a casing,
- at least two connection terminals,
- an internal electrical circuit connecting the two connection terminals and formed for example by an electrical conductor,
- an opening member which is movable and arranged to open a part to be opened of the internal electrical circuit when moving between an initial position and a final position, so as to form at least two discrete portions of conductor after opening,
- a pyrotechnic actuator arranged to move the opening member from the initial position to the final position,
- an inner chamber defined by an inner wall formed in the casing, and receiving the part to be open,
- an insulating grease, arranged in the inner chamber, characterized in that the insulating grease is arranged on or covers at least two predetermined parts of the inner wall. According to the above implementation, the insulating grease is arranged on or covers at least two predetermined parts of the inner wall, in order to cut or cover or pass through leakage current paths present on the inner wall after the operation of the pyrotechnic actuator, even if the latter has projected conductive particles onto the inner wall of the inner chamber. Indeed, such conductive particles are "embedded" in the insulating grease, and it suffices to provide this insulating grease on at least part of the leakage current path in order to cut off any leakage current, so as to provide a high insulation resistance. It may be noted that it is sufficient to provide the insulating grease on at least two predetermined parts of the inner wall, in order to cut or cover or pass through leakage current paths present on the inner wall after the operation of the pyrotechnic actuator, which limits the amount of grease necessary to provide high insulation resistance (at least 2 to 10 seconds after operation).

The insulating grease does not have a function to limit the presence of an electric arc during operation, so there is no need for a large quantity. It suffices to coat the two predetermined parts of the inner wall. In particular, the insulating grease is placed predominantly at a distance from the conductor forming the part to be opened of the internal electrical circuit, so as not to undergo the influence of an electric arc.

In particular, the insulating grease can be arranged at a distance away from an electrical arc path.

According to one embodiment, the insulating grease can be arranged at a distance away from the internal electrical circuit at the moment of the opening carried out by the opening member. In other words, the electrical conductor that must be broken is free of insulating grease, which prevents any interaction between the insulating grease and an electric arc generated during the breaking.

According to one embodiment, the conductor forming the part to be opened of the internal electrical circuit can have an opening zone or a zone of weakness intended to be cut or open by the opening member, and the zone of opening or zone of weakness is free of insulating grease, at least before and even during the operation of the circuit breaker.

According to one embodiment, said at least two predetermined parts of the inner wall may be arranged on both sides of the breaking members, according to a transverse direction to the moving direction of the breaking member.

According to one embodiment, said at least two predetermined parts of the inner wall may be discrete.

According to one embodiment, the insulating grease may be arranged on or may cover only said at least two predetermined parts of the inner wall.

In other words, the quantity of insulating grease is limited to precise wall parts, which ensures a small total quantity, and also short opening times, compared to the case where a large quantity of insulating grease is used. Furthermore, by covering only said at least two predetermined parts of the inner wall, the grease has less risk of influencing the behavior of the arc when the current is cut off.

According to one embodiment, the insulating grease can have a mass of less than 80 mg, for example of 20±10 mg, and preferentially of 15±10 mg per predetermined zone. For example, if the insulating grease is deposited on four predetermined zones, a total mass of less than 240 mg, for example 80 ±15 mg, and preferentially 60±15 mg, will be provided.

According to one embodiment, once the opening member is in the final position, said at least two predetermined parts of the inner wall can be arranged on or can pass through a leakage current path between the two discrete portions of conductor.

According to one embodiment, once the opening member is in the final position, said at least two predetermined parts of the inner wall can be arranged on or can pass through a shortest leakage current path between the two discrete portions of conductor. The shortest leakage path is understood to mean the shortest path that a leakage current should travel on a wall of the inner chamber between the two discrete portions of conductor, and should not be confused with an arc path, which typically passes through the air contained in the inner chamber. In other words, the shortest leakage path is the shortest continuous path along one or more walls of the inner chamber between the two discrete portions of conductor in contact with one or more walls of the inner chamber.

According to one embodiment, the leakage current path may have a total length, the part of the leakage current path on which the insulating grease may be arranged or may cover may have an insulated length, and a ratio of the insulated length to the total length may be in a range from 0.08 to 0.60, preferably from 0.18 to 0.48 and more preferentially from 0.20 to 0.26.

According to one embodiment, upon movement from the initial position to the final position, the opening member may separate the part to be opened of the electrical conductor into at least two discrete portions of conductor at two inner ends forced apart from one another by the opening member upon movement from the initial position to the final position, so as to have, once the opening member is in final position, a free distance between the two inner ends, matching an arc path, less than the total length of the leakage current path between the two discrete portions of conductor, and in particular less than the total length of the shortest leakage current path between the two discrete portions of conductor. The movement of the opening member is sufficient to bend, curve, push, or move the two inner ends which are, in the final position, sufficiently distant from one another to guarantee arc extinguishing (in the air of the inner chamber) even in the event of a strong current at the moment of opening, yet less than the length of the leakage current path (on the wall(s) of the inner chamber), so that the management of an electric arc during opening is dissociated from the management of the insulation resistance after opening.

According to one embodiment, the conductor part to be opened may have a width to be opened, the opening member may have, in the direction of the width to be opened, an opening size greater than the width to be opened. This makes it possible to extend the leakage current path, by increasing a perimeter of the inner chamber. The opening size may be 5%, 10% or even 20% greater than the width to be opened.

In summary, one aspect of the invention therefore relates to a pyrotechnic circuit breaker comprising:

- a casing,
- at least two connection terminals,
- an internal electrical circuit connecting the two connection terminals and formed for example by an electrical conductor,
- an opening member which is movable and arranged to open a part to be opened of the internal electrical circuit when moving between an initial position and a final position, so as to form at least two discrete portions of conductor after opening,
- a pyrotechnic actuator arranged to move the opening member from the initial position to the final position,
- an inner chamber defined by an inner wall formed in the casing, and receiving the part to be open,
- an insulating grease, arranged in the inner chamber, characterized in that the insulating grease is arranged on or covers at least two predetermined parts of the inner wall, at least when the opening member is in the initial position.

According to one embodiment, when the opening member is in the initial position, the insulating grease may be collected in the path of the opening member between the initial position and the final position, and the opening member may be arranged to move, or project, or spread at least part of the insulating grease during the movement between the initial position and the final position.

According to one embodiment, the insulating grease is deposited and/or spread in the form of a layer on the inner wall. It is possible to provide for depositing or spreading the insulating grease on the inner walls during the manufacture of the circuit breaker, but it is possible to provide for this application to be carried out during the operation of the circuit breaker. The opening member can perform such a depositing or spreading operation.

According to one embodiment, the insulating grease is disposed in a recess, and during the opening of the internal electrical circuit, the insulating grease is driven out of the recess in order to cover the two predetermined parts of the inner wall. A piston or lever system may be provided which causes the grease to be expelled from the recess: before opening, the insulating grease is confined in a dedicated recess or cavity, and after operation, the insulating grease is located on the two predetermined parts of the inner wall.

In other words, one aspect of the invention therefore relates to a pyrotechnic circuit breaker comprising:

- a casing,
- at least two connection terminals,
- an internal electrical circuit connecting the two connection terminals and formed for example by an electrical conductor,
- an opening member which is movable and arranged to open a part to be opened of the internal electrical circuit when moving between an initial position and a final position, so as to form at least two discrete portions of conductor after opening,
- a pyrotechnic actuator arranged to move the opening member from the initial position to the final position,
- an inner chamber defined by an inner wall formed in the casing, and receiving the part to be open,
- an insulating grease, arranged in the inner chamber, characterized in that the insulating grease is arranged on or covers at least two predetermined parts of the inner wall, at least when the opening member is in the final position.

In particular, one aspect of the invention relates to a pyrotechnic circuit breaker comprising:

- a casing,
- at least two connection terminals,
- an internal electrical circuit connecting the two connection terminals and formed for example by an electrical conductor,
- an opening member which is movable and arranged to open a part to be opened of the internal electrical circuit when moving between an initial position and a final position, so as to form at least two discrete portions of conductor after opening,
- a pyrotechnic actuator arranged to move the opening member from the initial position to the final position,
- an inner chamber defined by an inner wall formed in the casing, and receiving the part to be open,
- an insulating grease, arranged in the inner chamber, characterized in that the insulating grease is arranged on or covers at least two predetermined parts of the inner wall, only when the opening member is in the final position.

According to one embodiment, the pyrotechnic circuit breaker may comprise at least one guide unit with:

- at least one guide protrusion that may be arranged on either one of the opening member or the casing,
- at least one guide groove that may be arranged on the other one of the opening member or the casing,
- the guide protrusion may be engaged in the guide groove to form the guide unit of the opening member on the casing, the guide groove may comprise at least one bottom or one side wall, and the insulating grease may be arranged on or may cover at least one part of the bottom or of the side wall.

According to one embodiment, the insulating grease is disposed, spread, arranged at the bottom of the groove, and/or in the groove, and/or on a lateral face of the groove.

According to one embodiment, the guide unit may have a first guiding part with a first clearance between the opening member and the casing, and a second guiding part with a second clearance between the opening member and the casing, greater than the first clearance, and the insulating grease may be arranged at the second guiding part.

According to one embodiment, the pyrotechnic circuit breaker may comprise at least one guide unit on each side of the opening member, in the direction of the width of the part to be opened of the electrical conductor.

According to one embodiment, the guide protrusion may comprise at least one chamfer arranged to spread the insulating grease during the movement between the initial position and the final position.

According to one embodiment, the opening member may be arranged to open the part to be opened of the electrical conductor, so as to form at least three discrete portions of conductor after opening, at least one of the three discrete portions of conductor may form at least one central portion, two of the three discrete portions of conductor may form two discrete lateral portions of conductor, at least one leakage current path may lead from the central portion towards each of the other two discrete lateral portions of conductor, and once the opening member is in final position, said at least two predetermined parts may be arranged on or may cross a part of said at least one leakage current path going from the central portion towards one of the other two discrete lateral portions of conductor.

According to one embodiment, two leakage current paths may lead from the central portion towards each of the other two discrete lateral portions of conductor, and once the opening member is in final position, said at least two predetermined parts may be arranged on or may cross a part of each of the two leakage current paths going from the central portion towards one of the other two discrete lateral portions of conductor. In other words, it suffices to cut all the leakage current paths between the central portion and one of the discrete lateral portions.

According to one embodiment, once the opening member is in final position, said at least two predetermined parts may be arranged on or may cross part of the four leakage current paths going from the central portion towards the other two discrete lateral portions of conductor.

According to one embodiment, the leakage current path may be arranged on a wall of the inner chamber.

According to one embodiment, the insulating grease may comprise silicone and/or polysiloxane.

According to one embodiment, the opening member may be a breaking member, and preferably a shearing member.

According to one embodiment, the part to be opened may be a continuous portion of electrical conductor, to be broken by irreversible plastic deformation.

According to one embodiment, the opening member may be a thrust member, arranged to displace at least a portion of the part to be opened, in order to be able to break a contact between two portions of conductors pressed against one another.

According to one embodiment, once the opening member is in the final position, an insulation resistance between the connection terminals may be greater than 30 Mohms, preferably greater than 50 Mohms, preferably greater than 100 Mohms, preferably greater than 500 Mohms, and very preferentially greater than 1 Gohms.

According to one embodiment, said at least part of the leakage current path covered by the insulating grease may have a length of less than 13 mm, preferably less than 10 mm.

According to one embodiment, when the opening member is in the initial position, the insulating grease can be contained in at least one enclosure, preferably an enclosure comprising at least two zones of weakness.

According to one embodiment, the opening member may be arranged to break said at least one enclosure when it moves from the initial position to the final position. Thus, the grease remains confined in a closed space until the device is ignited.

According to one embodiment, the opening member may comprise a central protrusion arranged to separate two discrete volumes of the insulating grease, during its movement from the initial position to the final position. This makes it possible to expel the grease toward two predetermined parts of the inner wall during the movement of the breaking member.

According to one embodiment, the inner wall, at said at least two predetermined parts, may have a roughness greater than Ra 1.6, and preferably greater than Ra 3.2.

Another aspect of the invention relates to a motor vehicle comprising at least one circuit breaker according to the first aspect.

DESCRIPTION OF THE FIGURES

Other characteristics and advantages of the present invention will become more apparent upon reading the detailed description of an embodiment of the invention, which is provided by way of example but in no manner limited thereto, and illustrated by the attached drawings, in which.

DETAILED DESCRIPTION OF EMBODIMENT(S)

Figure 1:
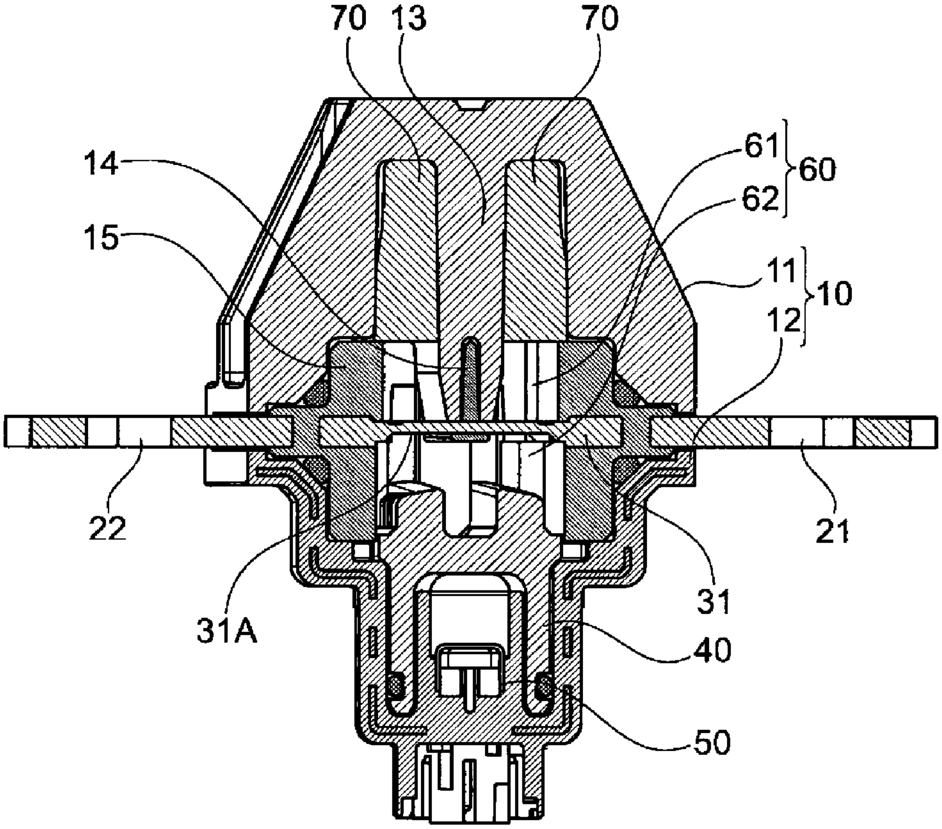
FIG. 1 shows a cross-sectional view of a pyrotechnic circuit breaker, comprising in particular a casing traversed by an electrical conductor forming an internal electrical circuit, a pyrotechnic actuator, and an opening member arranged to open the internal electrical circuit when the pyrotechnic actuator is actuated or triggered.

FIG. 1 shows a circuit breaker especially comprising:

a casing 10 formed by a lower casing portion 12 and an upper casing portion 11, two connection terminals 21 and 22, an internal electrical circuit connecting the two connection terminals 21 and 22 and formed by an electrical conductor 31,

- an opening member 40, movable and arranged to open a part to be opened 31A of the internal electrical circuit when moving between an initial position (according to FIG. 1) and a final position (according to FIG. 4), so as to form at least two discrete portions of conductor 32 and 33 (visible in FIG. 4) after opening,
- a pyrotechnic actuator 50 arranged to move the opening member 40 from the initial position to the final position,
- an inner chamber 60 (comprising a lower chamber 62 and an upper chamber 61), defined by an inner wall formed in the casing 10, and receiving the part to be opened 31A,
- coolers 70 arranged inside the casing 10 and defined to lower the temperatures of the gases during operation and thus increase the breaking capacity of the circuit breaker.

The circuit breaker of the figure is typically integrated into a power circuit of a motor vehicle (an electric vehicle, for example) and can be used to cut off the power circuit if an emergency occurs. One of the functions of this circuit breaker is therefore to be able to break a power circuit quickly, even if high currents are present (more than 500 amperes for example). Another function of this circuit breaker is to guarantee good insulation resistance between the connection terminals 21 and 22 after the internal electrical circuit is opened.

Figure 4:
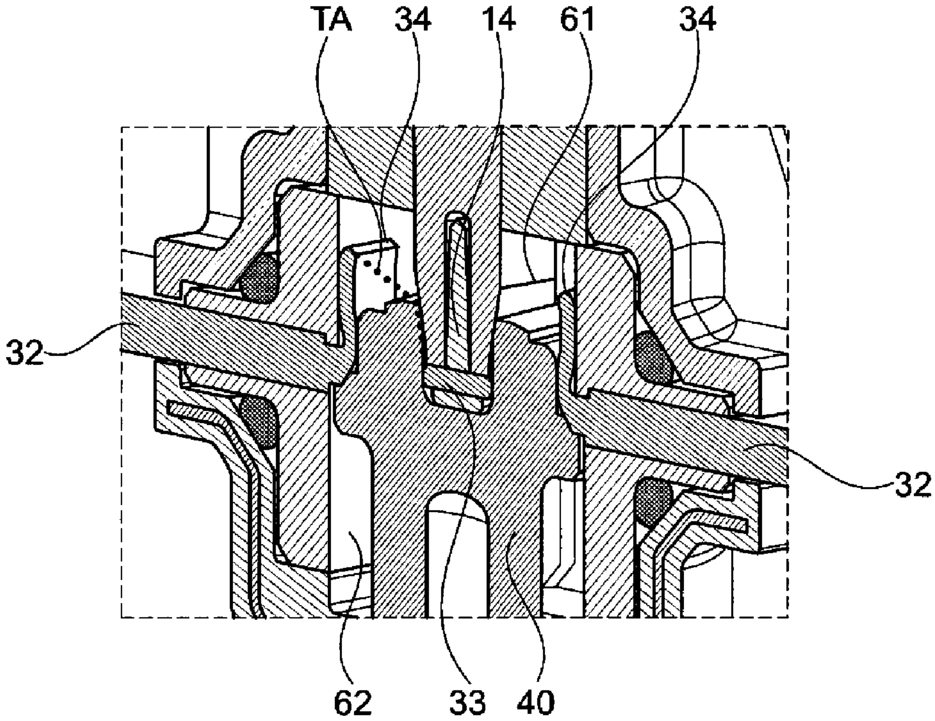
FIG. 4 shows a detail of a cross-section of the circuit breaker of FIG. 1 after the pyrotechnic actuator is actuated or triggered.

In order to address the opening function, the pyrotechnic actuator 50 (typically an electro-pyrotechnic igniter) is triggered and a high pressure is generated in the space between the pyrotechnic actuator 50 and the opening member 40, which pushes the latter towards the top of FIG. 1, to move from the initial position shown to the final position of FIG. 4.

During this movement, the opening member comes into contact with the part to be opened 31A of the electrical conductor, and therefore opens the internal electrical circuit by cutting the electrical conductor 31, by a mechanical shearing.

Figure 3:
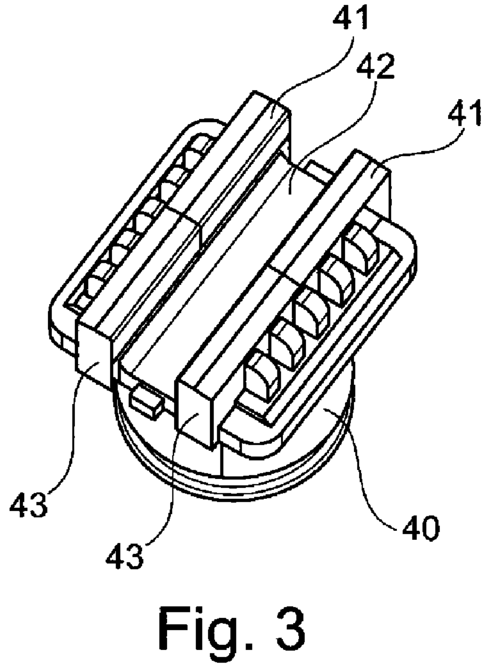
FIG. 3 shows a detail of the opening member of the circuit breaker of FIG. 1.

In fact, as shown in FIG. 3, the opening member 40 comprises two projections 41, separated by a groove 42, and which form knives to cut the part to be opened 31A. In detail, and as shown in FIG. 1, the part to be opened 31A comprises a central portion supported by a return 13 of the upper casing portion 11, engaged with a bar 14 overmolded on the central portion of the part to be opened 31A and integral with an overmolded body 15, overmolded on the electrical conductor 31.

When the opening member 40 moves from the initial position to the final position, the projections 41 of the opening member 40 bear on the non-supported parts of the electrical conductor 31 and shear it on either side of the bar 14 and the return 13 (at the part to be opened 31A opposite the upper chamber 61).

As shown in FIG. 4, the shearing of the electrical conductor 31 forms:

- two discrete lateral portions 32 with an inner end 34 in the inner chamber 60 (and in particular in the upper chamber 61), and
- a central portion 33, which remained engaged with the bar 14.

Furthermore, at the very beginning of opening, when the inner ends 34 are still in the vicinity of the central portion 33, an electric arc can form (depending on whether current passes through the electrical conductor 31 or not) between each inner end 34 and the central portion 33, at an arc path TA shown in dotted lines in FIG. 4. During the movement from the initial position to the final position, the opening member 40 pushes and causes each discrete lateral portion 32 to bend, so that the arc path TA "stretches" or "elongates" in order to present at the end of operation a sufficient free distance to guarantee an electric arc extinguishing and a rapid cutting or opening of the internal electrical circuit.

Figure 2:
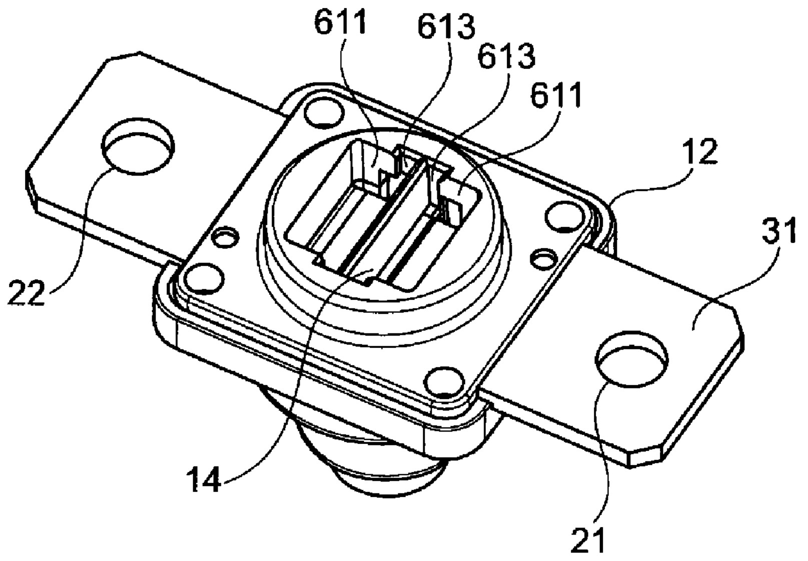
FIG. 2 shows a detail of the casing of the circuit breaker of FIG. 1.

FIGS. 2 and 3 show the mounting of the opening member 40 in the casing 10, and in particular, guide units are provided between the opening member 40 and the casing 10, at the overmolded body 15. Indeed, the opening member (FIG. 3) is provided with lateral projections 43 forming guide protrusions, and the overmolded body 15 with lateral grooves 613 forming guide grooves, formed in lateral walls 611 of the upper chamber 61.

The opening member 40 is therefore mounted in a sliding or translational connection relative to the casing 10 and slides during its movement from the initial position to the final position, which provides a reproducible, controlled final operation and position in order to guarantee rapid opening and arc extinguishing at the end of operation with a sufficient free distance.

However, the operation of the pyrotechnic actuator 50 can generate numerous hot particles and gases which are projected into the inner chamber 60, and which typically cover or condense on the walls of the latter, and in particular the walls 611, the lateral projections 43 and the lateral grooves 613. Such deposits can form an electrically conductive or slightly electrically conductive layer, and an insulation resistance, after opening of the electrical conductor 31, may be affected.

Such an insulation resistance, measured after operation, between the connection terminals 21 and 22 must be high, to guarantee an absence of leakage current between the connection terminals 21 and 22 after opening the internal electrical circuit of the circuit breaker.

Such leakage currents typically pass through leakage current paths between the discrete portions of conductor after opening, which extend along the inner wall of the inner chamber 60.

Figure 5:
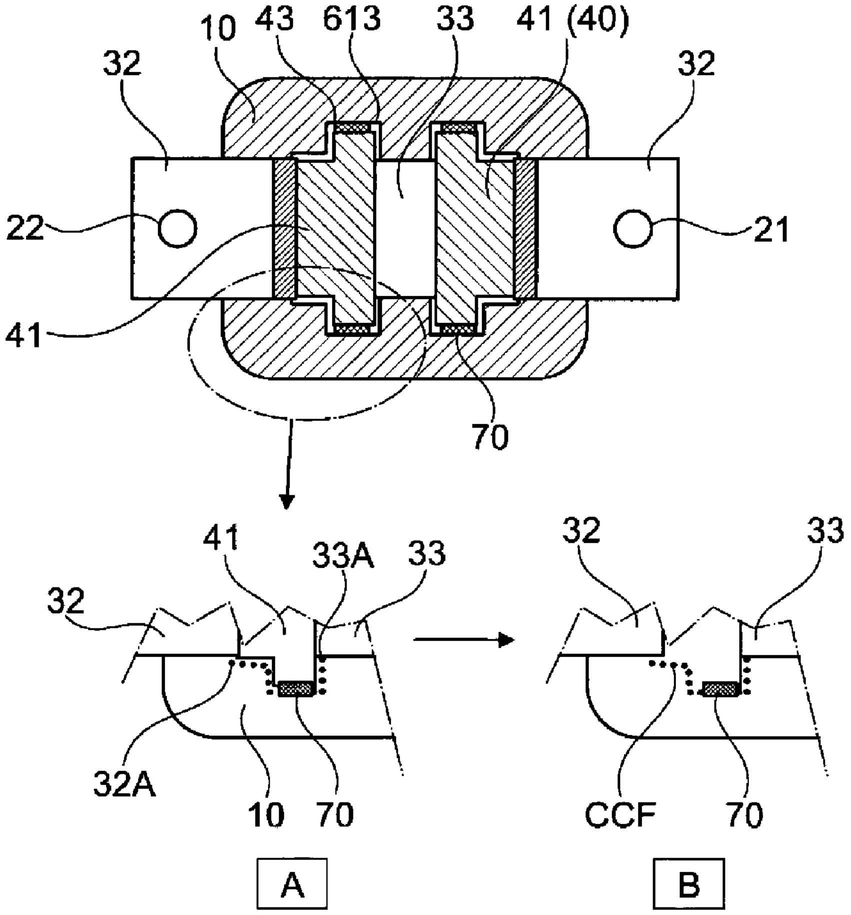
FIG. 5 schematically represents a cross section in top view of the circuit breaker of FIG. 1.

FIG. 5 shows a schematic cross-section (not showing all the details of FIG. 1) of the circuit breaker of FIG. 1 after opening, in a plane passing through the upper face of the electrical conductor 31, seen from above.

The electrical conductor 31 has therefore been opened in three discrete portions of conductor, that is two discrete lateral portions 32 and a central portion 33. The central portion 33 is separated from the two discrete lateral portions 32 by the lateral projections 43 of the opening member 40.

Detail A and detail B of FIG. 5 show that a leakage current can travel a leakage current path CCF formed along the inner wall of the inner chamber, between the lower corner 32A of the discrete lateral portion 32 and the lower corner 33A of the central portion 33. It should be noted that the function of providing good insulation resistance is to be ensured after operation, once the electrical conductor 31 has been broken or opened. Typically, a leakage current cannot be established along the arc path TA because the resistivity of the air is too great. Consequently, a leakage current can only pass along the walls of the circuit breaker, in particular the inner walls of the inner chamber 60 or the walls of the opening member 40, doing so on the shortest path, which has the lowest insulation resistance.

In order to guarantee good insulation resistance, it is proposed to position insulating grease 70 on the inner wall (and/or on the walls of the opening member 40) so as to cut off the leakage current path, and preferably the shortest leakage current path. Generally, it is proposed to arrange insulating grease 70 on at least part of the leakage current path CCF. Preferentially, it is proposed to arrange insulating grease on at least two predetermined parts of the inner wall of the inner chamber 60.

As shown by details A and B of FIG. 5, insulating grease 70 is placed on the leakage current path CCF, so as to cut it over a limited part. Consequently, the leakage current can no longer get through, which guarantees good insulation resistance In practice, with such an implementation, the insulation resistance between the connection terminals is greater than 30 Mohms, preferably greater than 50 Mohms, preferably greater than 100 Mohms, preferably greater than 500 Mohms, and very preferentially greater than 1 Gohms. Indeed, insulating grease 70 prevents leakage current from being established, even if particles or condensed gases are deposited on the inner wall of the inner chamber.

As shown in FIG. 5, insulating grease is placed on four predetermined parts of the inner wall of the inner chamber 60, so that all the leakage current paths CFF starting from the central portion 33 are cut at least in one place. As shown in FIG. 5, the insulating grease 70 is placed on either side of the opening member 40, in a vertical direction (transverse to the direction of movement).

FIG. 5, a section at the electrical conductor 31, contains in this example the shortest leakage path, that shown in detail B. However, it is provided that insulating grease be placed above, below and at the electrical conductor 31 (and thus along an axis normal in FIG. 5) to ensure that all the leakage current paths having a length equal to [0%; 15%] of the length of the shortest leakage current path are also cut.

According to the example presented here, the insulating grease 70 is positioned on the parts of the inner wall forming the bottom of the lateral groove 613, which allows for localized, simultaneous application on the inner wall of the inner chamber and on the wall of the lateral projections 43 of the opening member 40, which guarantees an effective cutting of all possible leakage current paths. However, the insulating grease 70 could be positioned on another surface of the lateral groove 613.

The insulating grease 70 is placed on delimited parts of the inner wall, and not over the entire inner wall, since the applicant has noticed that this limits the influences on the cut-off times. Indeed, tests were conducted with insulating grease over the entire inner wall of the inner chamber 60, with a cut-off time of up to 0.3 ms, and were tests with the same conditions, but insulating grease 70 only on the predetermined portions shown in FIG. 5, with a cut-off time of less than 0.2 ms were conducted. In general, the insulating grease 70 is therefore provided only at the predetermined locations described, and is not located on the rest of the walls of the chamber, nor on the electrical conductor 31 before cut-off, or the discrete portions of conductor 33, 32 after cut-off. In particular, the zones where the electrical conductor 31 is cut off by the opening member 40 are free of insulating grease 70.

In general, two possibilities for positioning the insulating grease 70 on the predetermined parts are available: positioning the insulating grease 70 on the predetermined parts directly upon mounting the circuit breaker, or providing that the insulating grease 70 is placed or moved or projected onto the predetermined parts during the operation of the circuit breaker.

In the first case, it is possible to refer to FIG. 5 to identify where the insulating grease 70 is placed as soon as the circuit breaker is mounted: on the inner wall of the inner chamber 60, on either side of the opening member 40, and on either side and at the electrical conductor 31 (that is in the lower chamber 62, in the upper chamber 61, and at the edge of the electrical conductor 31).

In the second scenario, it is possible to provide a dab of the insulating grease 70 above each side of the opening member 40, just above each lateral projection 43. Consequently, the insulating grease 70 will be spread over the entire height of each predetermined portion of the inner surface by the opening member 40 when it moves from the initial position to the final position. A layer of insulating grease is therefore spread over at least a portion of the lateral groove 613.

In the second scenario, it is alternatively possible to provide a dab of the insulating grease 70 over the stroke of the opening member 40 so that the latter projects the insulating grease 70 at the desired locations. It is in particular possible to provide a closed tank or enclosure containing the insulating grease 70. Preferably, an enclosure can be provided with two zones of weakness to project insulating grease 70 at the desired locations.

The insulating grease 70 may be chosen from silicone grease (containing siloxanes or polysiloxanes). It is possible to provide a thickness of at least 0.1 mm on each predetermined part of the inner wall over a width of at least 1 mm, or 2 mm, and over a length (or height in FIG. 1) of at least 5 mm, and preferably at least 7 mm. With reference to FIGS. 2 and 3, insulating grease 70 can be provided over at least 80% of the bottom of the groove 613, and at least 80% of the surface of the lateral projection 43.

It will be understood that various modifications and/or improvements which are obvious for the person skilled in the art may be made to the different embodiments of the invention described in the present description without departing from the scope of the invention.

The invention claimed is:

1. A pyrotechnic circuit breaker comprising:
- a casing;
- at least two connection terminals;
- an inner electrical circuit connecting the two connection terminals and formed, for example, by an electrical conductor;
- an opening member, movable and arranged to open a part to be opened of the inner electrical circuit during a movement between an initial position and a final position, so as to form at least two discrete portions of the electrical conductor after opening;
- a pyrotechnic actuator arranged to move the opening member from the initial position to the final position;
- an inner chamber defined by an inner wall formed in the housing, and receiving the part to be opened; and
- an insulating grease arranged in the inner chamber,
- wherein the insulating grease is arranged on or covers at least two predetermined parts of the inner wall and is spaced from the electrical conductor before firing of the pyrotechnic circuit breaker such that the electrical conductor is free of insulating grease, and
- where the insulating grease functions to increase an insulative resistance of the pyrotechnic circuit breaker after firing.

2. The pyrotechnic circuit breaker according to claim 1, wherein, the at least two predetermined parts of the inner wall are arranged on both sides of the opening member, according to a transverse direction to the moving direction of the opening member.

3. The pyrotechnic circuit breaker according to claim 1, wherein the insulating grease is arranged on or covers only the at least two predetermined parts of the inner wall.

4. The pyrotechnic circuit breaker according to claim 1, wherein, once the opening member is in final position, the at least two predetermined parts of the inner wall are arranged on or cross the shortest leakage current path between the two discrete portions of conductor.

5. The pyrotechnic circuit breaker according to claim 4, wherein the leakage current path has a total length, wherein a part of the leakage current path whereupon the insulating grease is arranged or covered by the insulating grease has an insulated length, and wherein a ratio of the insulated length to the total length is in a range from 0.08 to 0.60.

6. The pyrotechnic circuit breaker according to claim 1, wherein:

the part of conductor to be opened has a width to be opened, wherein the opening member has, in the direction of the width to be opened, an opening size greater than the width to be opened.

7. The pyrotechnic circuit breaker according to claim 1, wherein;

whereupon the opening member is in initial position, the insulating grease is collected in the path of the opening member between the initial position and the final position, and wherein the opening member is arranged to move at least one part of the insulating grease upon movement between the initial position and the final position.

8. The pyrotechnic circuit breaker according to claim 1, comprising at least one guide unit having:

at least one guide protrusion arranged on either one of the opening member or the casing, and at least one guide groove arranged on the other of the opening member or the casing, wherein the guide protrusion is engaged in the guide groove to form the guide unit of the opening member on the casing, wherein the guide groove comprises at least one bottom or one side wall, and wherein the insulating grease is arranged on or covers at least one part of the bottom or of the side wall.

9. The pyrotechnic circuit breaker according to claim 1, wherein:

the opening member is arranged to open the part to be opened of the electrical conductor, so as to form at least three discrete portions of conductor after opening, least one of the three discrete portions of conductor forms at least one central portion, two of the three discrete portions of conductor form two discrete lateral portions of conductor, at least one leakage current path leads from the central portion towards each of the other two discrete lateral portions of conductor, and once the opening member is in final position, the at least two predetermined parts are arranged on or cross a part of the at least one leakage current path going from the central portion towards one of the other two discrete lateral portions of conductor.

10. The pyrotechnic circuit breaker according to claim 9, wherein two leakage current paths lead from the central portion towards each of the two other discrete portions of conductor, and wherein once the opening member is in final position, the at least two predetermined parts are arranged on or cross a part of each of the two leakage current paths going from the central portion towards one of the other two discrete lateral portions of conductor.

11. The pyrotechnic circuit breaker according to claim 4, wherein the at least part of the leakage current path covered by the insulating grease has a length of less than 13 mm.

12. The pyrotechnic circuit breaker according to claim 1, wherein the inner wall, at the at least two predetermined parts, has a roughness greater than Ra 1.6.

13. The pyrotechnic circuit breaker according to claim 1 in combination with a motor vehicle.

14. The pyrotechnic circuit breaker according to claim 1, wherein the at least two predetermined parts of the inner wall including the insulating grease are spaced apart from one another such that insulating grease is not provided between the at least two predetermined parts.

15. The pyrotechnic circuit breaker according to claim 1, wherein the pyrotechnic circuit breaker is configured to cut the electrical connector into first and second lateral portions and a central portion upon firing.

16. The pyrotechnic circuit breaker according to claim 15, wherein the insulating grease is provided on four predetermined parts of the inner wall of the inner chamber.

17. The pyrotechnic circuit breaker according to claim 1, wherein the inner wall of the inner chamber includes a plurality of lateral grooves and the insulating grease is provided on a bottom of the lateral grooves.

* * * * *